United States Patent [19]

Kalamon

[11] 4,321,840
[45] Mar. 30, 1982

[54] MOTION TRANSMITTING REMOTE CONTROL ASSEMBLY (SWIVEL SLEEVE)

[75] Inventor: Bruce Kalamon, Pottstown, Pa.

[73] Assignee: Teleflex Incorporated, Limerick, Pa.

[21] Appl. No.: 96,900

[22] Filed: Nov. 23, 1979

[51] Int. Cl.$^3$ .............................................. F16C 1/26
[52] U.S. Cl. ................................. 74/501 R; 403/165;
74/501 P
[58] Field of Search ............... 74/501 R, 501 P, 502,
74/503, 422, 480; 403/164, 165

[56] References Cited

U.S. PATENT DOCUMENTS

| | | | |
|---|---|---|---|
| 2,821,092 | 1/1958 | Cordora et al. | 74/501 P |
| 2,858,708 | 11/1958 | Brickman | 74/501 P |
| 2,896,474 | 7/1959 | Rhodes | 403/164 X |
| 3,373,632 | 3/1968 | Jeromson, Jr. et al. | 74/501 P X |
| 3,424,027 | 1/1969 | Tschanz et al. | 403/165 X |
| 3,838,607 | 10/1974 | Hemens | 74/501 P X |
| 3,994,185 | 11/1976 | Gilardi | 74/501 P |

FOREIGN PATENT DOCUMENTS 593287  2/1960  Canada ............................ 74/501 P

*Primary Examiner*—Kenneth Dorner
*Attorney, Agent, or Firm*—McGlynn and Milton

[57] ABSTRACT

A motion transmitting remote control assembly of the type for transmitting motion along a curved path by a flexible motion transmitting core element supported within a conduit. The motion transmitting assembly includes a flexible conduit extending from and attached within an end fitting and a swivel member pivotally attached to the end fitting at a swivel joint. A flexible motion transmitting core element is supported within the assembly. A sleeve surrounds the core element and extends from within the end fitting, through the swivel joint and into the swivel member for reducing friction of linear movement of the core element within the assembly and for providing a seal throughout the swivel joint. The swivel member includes a wiper cap for preventing foreign matter on the extended length of the core element from entering the assembly.

6 Claims, 1 Drawing Figure

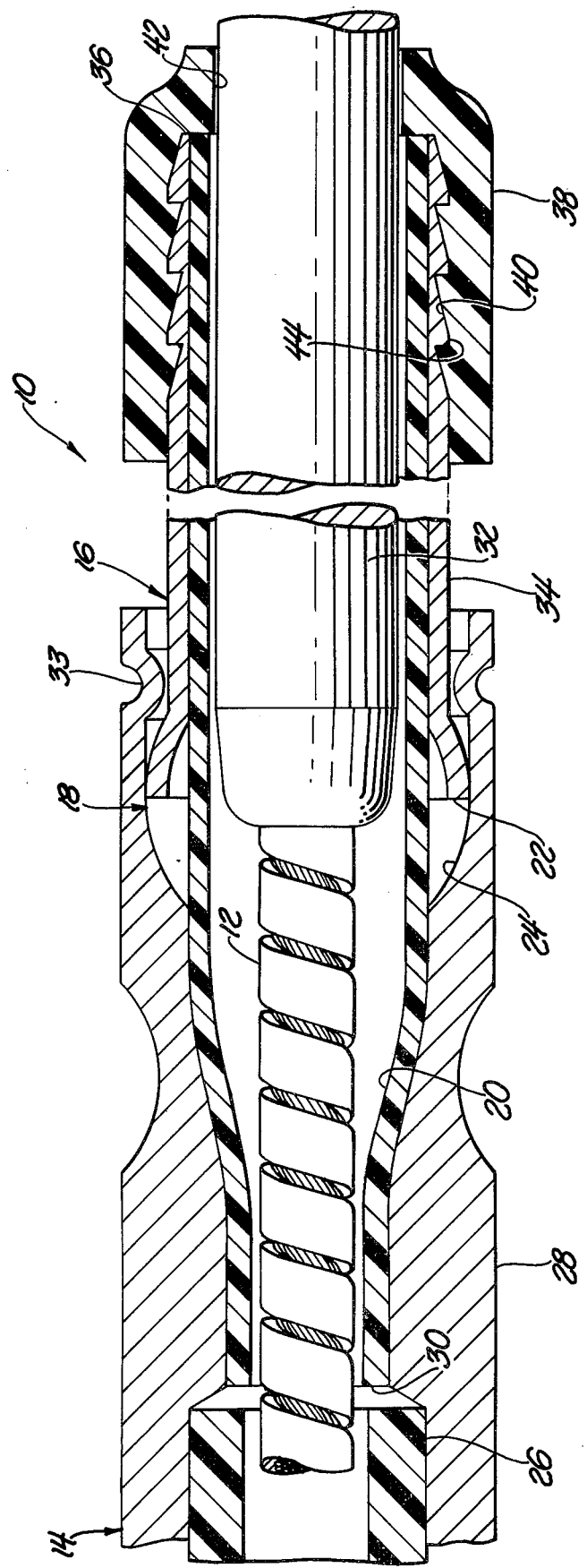

MOTION TRANSMITTING REMOTE CONTROL ASSEMBLY (SWIVEL SLEEVE)

BACKGROUND OF THE INVENTION (1) Field of the Invention

The subject invention relates to a motion transmitting remote control assembly of the type for transmitting motion along a curved path by a flexible motion transmitting core element movably supported by a guide means such as a conduit. More specifically, the subject invention relates to assemblies in which a core element extends from a conduit through a swivel joint into a swivel member and extends therefrom.

(2) Description of the Prior Art

A variety of remote control assemblies include a conduit supporting a wire or cable core in which the core is slidably coated with a plastic material designed to reduce friction. Many such assemblies include a rod frequently made of metal attached to a wire-like core element being slidably supported in a sleeve. In those assemblies which include a swivel joint, the sleeve member has a male spherical ball at the end thereof disposed at a female spherical socket in the end of an end fitting for swivelling movement. In such swivel joint assemblies, the mating between the male and female surfaces at the swivel joint are seldom perfect which, therefore, results in an incomplete seal surrounding the core element. Also, there is an increased friction at the swivel joint. These factors could lead to increased foreign substances within the support assembly and undesirable wear at the swivel joint.

SUMMARY OF THE INVENTION

The subject invention relates to a motion transmitting remote control assembly of the type for transmitting motion in a curved path by a flexible motion transmitting core element. The assembly includes a flexible motion transmitting core element, a guide means for movably supporting the core element and a swivel means pivotally attached to an end portion of the guide means for swivelling movement relative to the guide means and movably supporting the core element. The swivel means is attached to the guide means at a swivel joint. The assembly also includes a sleeve means surrounding the core element and extending from within the guide means through the swivel joint and into the swivel means. The sleeve means is flexible at the swivel joint. The subject invention, therefore, results in reduced friction of linear movement of the core element within the entire assembly and provides a seal throughout the swivel joint.

PRIOR ART STATEMENT

As previously stated, motion transmitting remote control assemblies are known in the prior art wherein the assembly includes a swivel joint. However, assemblies such as these do not perfect a seal within the swivel joint and also experience increased wear at the swivel joint due to friction therein.

Pertinent to the above is U.S. Pat. No. 3,994,185 granted Nov. 30, 1976 to Gilardi and assigned to Anstalt Egra. That patent discloses a sheathed core element axially movable and extending through a swivel joint. However, in the above patent foreign matter may enter the assembly through the swivel joint and the core element is subjected to friction loads during swivelling movement. The above patent disclosure is exemplary of the prior art. The subject invention overcomes deficiencies in those prior art assemblies.

BRIEF DESCRIPTION OF THE DRAWINGS

Other advantages of the present invention will be readily appreciated as the same becomes better understood by reference to the following detailed description when considered in connnection with the accompanying drawing which is a cross-sectional view showing the preferred embodiment of the motion transmitting remote control assembly of the subject invention.

DESCRIPTION OF THE PREFERRED EMBODIMENT

A motion transmitting remote control assembly of the type for transmitting motion in a curved path by a flexible motion transmitting core element is generally shown at 10. The motion transmitting remote control assembly 10 includes a flexible motion transmitting core element 12 and a guide means generally indicated at 14 for movably supporting the core element 12. The assembly 10 also includes a swivel means generally indicated at 16 pivotally attached to an end portion of the guide means 14 for swivelling movement relative to the guide means 14 and movably supporting the core element 12. The swivel means 16 is attached to the guide means at a swivel joint generally indicated at 18. Also included in the assembly is a sleeve means 20 surrounding the core element 12 and extending from within the guide means 14 through the swivel joint 18 and into the swivel means 16. The sleeve means 20 is flexible at the swivel joint 18. It is preferably of a polymeric or plastic material so as to be flexible along its entire length. The sleeve means reduces friction of linear movement of the core element within the assembly and provides a seal throughout the swivel joint.

The swivel means generally indicated at 16 includes a male swivel portion 22 having a convex spherical surface. The end of the guide means 14 includes a female swivel portion 24 having a partial concave spherical surface for receiving and supporting the male swivel portion 22 of the swivel means 16.

The guide means generally indicated at 14 includes a conduit 26 and an end fitting 28. The conduit 26 is secured within and extends from one end of the end fitting 28. The attachment may be accomplished by welding or crimping the end of the metal fitting to the conduit or the end fitting 28 may be made of plastic molded about the conduit 26. Any such attachment may be made so as not to impede the movement of the enclosed cable 12. The other end of the end fitting 28 includes the female swivel portion 24 of the guide means 14. The sleeve means 20 is supported within the end fitting 28 and extends to a position adjacent the end of the conduit 26, i.e., the end of the conduit 26 abuts or nearly abuts the end 30 of the sleeve means 20 thereby sealing the core element 12 within the assembly. After the male portion 22 is disposed in the female portion 24, a crimp or retention rib 33 is forced into the end fitting 28 to retain the swivel means 16 to the end fitting 28. It will be appreciated, however, that materials and attachments other than specifically described may be employed within the inventive concept.

The core element 12 includes a slide rod 32 which is slidably supported within and extends from the swivel means 16. The slide rod may be made of a metal or plastic material and is secured to the flexible core.

In the preferred embodiment shown at 10, the swivel means 16 includes a metal tube portion 34. The sleeve member 20 extends from its end 30 abutting the conduit 26 throughout the end fitting 28 and swivel joint 18 to the distal end 36 of the tube portion 34 of the swivel means 16.

A wiper means 38 is attached to the distal end of the tube portion 34 of the swivel means 16. The wiper cap includes a lip 42 which abuts the distal end 36 of the tube portion 34 and the sleeve member 20. The lip 42 is in sliding engagement with the rod portion 32 of the core element 12 for preventing foreign substances from entering the end of the tube portion 34 of the swivel means 16. The wiper cap 38 may be attached to the swivel means 16 in any suitable fashion. In the preferred embodiment the bore within the wiper cap 38 includes a plurality of ratcheting teeth or annular ramps 40 therealong. The tube portion 34 of the swivel means 16 includes ratcheting teeth or annular ramps 44 thereon. The ratcheting teeth 44 of the tube member 34 interact or lock with the ratcheting teeth 40 of the wiper cap 38 and mechanically secure the wiper cap 38 to the swivel means 16. The wiper cap is preferably made of a polymeric or plastic material.

In the preferred embodiment the core member 12 is made of a stranded cable with a helical flat wrap thereabout which is of the type well known in the art. The core element could be made of any other suitable wirelike or cable construction with the slide rod 32 attached thereto.

The invention has been described in an illustrative manner and it is to be understood that the terminology which has been used is intended to be in the nature of words of description rather of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege claimed are defined as follows:

1. A motion transmitting remote control assembly of the type for transmitting motion in a curved path by a flexible motion transmitting core element, said assembly comprising: a flexible motion transmitting core element, guide means for movably supporting said core element and having an end portion, swivel means pivotally attached to said end portion of said guide means for swivelling movement relative to said guide means and movably supporting said core element, said swivel means attached to said guide means at a swivel joint, and sleeve means surrounding said core element and allowing movement of said core element relative thereto and extending from within said guide means through said swivel joint into said swivel means and being flexible at said swivel joint for reducing friction of linear movement of the core element within the assembly and providing a seal throughout the swivel joint.

2. An assembly as set forth in claim 1 wherein said swivel means includes a male swivel portion having a convex spherical surface, said end of said guide means having a female swivel portion, said female swivel portion having a partially concave spherical surface for receiving and supporting said male swivel portion of said swivel means.

3. An assembly as set forth in claim 2 wherein said guide means includes a conduit and end fitting, said conduit being secured within and extending from an end of said end fitting, said end fitting having said female swivel portion at the other end, said sleeve means being supported within said end fitting and extending to a position adjacent said conduit.

4. An assembly as set forth in claim 3 wherein said core element includes a slider rod slidably supported in and extending from said swivel means.

5. An assembly as set forth in claim 4 wherein said swivel means includes a tube portion having a distal end, said sleeve member extending to said distal end of said tube portion.

6. An assembly as set forth in claim 5 wherein said swivel means includes a wiper cap attached to the distal end of said tube portion, said wiper cap being in sliding engagement with said rod portion and having a lip abutting the distal end of said tube portion and said sleeve member for preventing foreign substances from entering the end of said tube portion of said swivel means.

* * * * *